(12) United States Patent
Wildschütz

(10) Patent No.: US 11,197,480 B2
(45) Date of Patent: Dec. 14, 2021

(54) SEPARATION MEANS FOR THE AVOIDANCE AND/OR ELIMINATION OF MICROBIAL GROWTH IN A STORAGE FOR A LIQUID HYDROCARBON, METHOD FOR AVOIDING AND/OR ELIMINATION OF MICROBIAL GROWTH IN A STORAGE USING THE SEPARATION MEANS, AND STORAGE FOR A LIQUID HYDROCARBON USING SEPARATION MEANS

(71) Applicant: FAUDI Aviation GmbH, Stadtallendorf (DE)

(72) Inventor: Marcus Wildschütz, Neuss (DE)

(73) Assignee: FAUDI Aviation GmbH, Stadtallendorf (DE)

( * ) Notice: Subject to any disclaimer, the term of this patent is extended or adjusted under 35 U.S.C. 154(b) by 0 days.

(21) Appl. No.: 15/544,046

(22) PCT Filed: Dec. 1, 2015

(86) PCT No.: PCT/EP2015/078124
§ 371 (c)(1),
(2) Date: Aug. 17, 2017

(87) PCT Pub. No.: WO2016/116119
PCT Pub. Date: Jul. 28, 2016

(65) Prior Publication Data
US 2017/0367344 A1 Dec. 28, 2017

(30) Foreign Application Priority Data
Jan. 20, 2015 (DE) ...................... 10 2015 100 756.8

(51) Int. Cl.
*A01N 59/16* (2006.01)
*A01N 25/12* (2006.01)

(52) U.S. Cl.
CPC ............. *A01N 59/16* (2013.01); *A01N 25/12* (2013.01)

(58) Field of Classification Search
None
See application file for complete search history.

(56) References Cited

U.S. PATENT DOCUMENTS

| | | |
|---|---|---|
| 2,907,717 A | 10/1959 | Hann |
| 3,179,603 A | 4/1965 | Edwards et al. |
| 3,291,580 A | 12/1966 | Malick |
| 3,467,349 A | 9/1969 | Gautier |
| 3,502,509 A | 3/1970 | Sindorf |
| 3,869,388 A | 3/1975 | Vennett |
| 5,992,205 A | 7/1999 | Patterson |
| 6,432,169 B1 | 8/2002 | Kluwe et al. |
| 2012/0285693 A1 | 11/2012 | Mirakyan et al. |
| 2014/0205642 A1* | 7/2014 | Ballard ..................... D01F 6/48 424/409 |

FOREIGN PATENT DOCUMENTS

| | | | |
|---|---|---|---|
| CN | 102391597 | 3/2012 | |
| DE | 1 275 955 | 8/1966 | |
| DE | 10 2004 053 645 | 5/2006 | |
| DE | 10 2008 063023 | 7/2010 | |
| DE | 10 2012 006858 | 10/2013 | |
| EP | 0 771 525 | 5/1997 | |
| EP | 0771525 B1 * | 3/1998 | ............. A01N 25/10 |
| GB | 1 122 975 | 8/1966 | |
| JP | 2002-275654 | 9/2002 | |
| RU | 2581427 C2 * | 4/2016 | ............. C09K 8/605 |
| WO | 2014/154946 | 10/2014 | |

OTHER PUBLICATIONS

Evanoff et al (ChemPhysChem, 2005, 6, 1221-1231) (Year: 2005).*
Chumanov et al (AdvMater, 2005, 17, 1905-1908) (Year: 2005).*
Tim Rivard, "Sludge Contamination . . . Diesel Fuel", Fuel Technology, Jan. 1, 2013, XP055244634, p. 47-49.
F. Bento et al., "Biodeterioration of . . . in Brazil", International Biodeterioration & Biodegradation, vol. 47, No. 2, Mar. 1, 2001, p. 107-112.
W. Dziegielewski et al., "Discussion on . . . naval fuels", Polish Maritime Research, vol. 16, No. 3, Jan. 1, 2009.
BASF Aerospace Materials, "Kerojet aquarius water scavenger additive", Jan. 1, 2013, retrieved from internet: URL: http://www.aerospace.basf.com/common/pdfs/BASF_Kerojet_Aquarious_DS_USL_sfs.pdf.
M. Birmele et al., "Disinfection of . . . Ionic Silver", Research Disclosure, Mason Publications, vol. 570, No. 36, Oct. 1, 2011, p. 1175.
Momoh, A.O et al., Evaluation of the . . . Castor Seeds (*Ricinus communis* Linn), Bulletin of Environment, Pharmacology and Life Sciences, vol. 1 (10), Sep. 2012, 21-27.
Sinschek, "what to do?", www.segeinmagazin.de (2009).

* cited by examiner

Primary Examiner — Celeste A Roney
(74) Attorney, Agent, or Firm — Clark & Brody LP

(57) ABSTRACT

A separation agent for avoiding and/or destroying microbial growth in a store for a liquid hydrocarbon is provided wherein an interface between a phase of a liquid hydrocarbon and a phase of water can be reduced. The agent has a density which is higher than the density of a liquid hydrocarbon and lower than the density of water. By using the agent, simple, economical, efficient and long-lasting avoidance and/or destruction of microbial growth in a store for a liquid hydrocarbon is ensured. The avoidance and/or destruction includes inhibition of the increase in the microorganisms already present in the store and/or the killing thereof and a high quality of the respective liquid hydrocarbon is ensured. A method for avoiding and/or destroying microbial growth in a store for a liquid hydrocarbon, and a store for a liquid hydrocarbon which is suitable for the avoidance and/or destruction of microbial growth are also disclosed.

11 Claims, 3 Drawing Sheets

SEPARATION MEANS FOR THE AVOIDANCE AND/OR ELIMINATION OF MICROBIAL GROWTH IN A STORAGE FOR A LIQUID HYDROCARBON, METHOD FOR AVOIDING AND/OR ELIMINATION OF MICROBIAL GROWTH IN A STORAGE USING THE SEPARATION MEANS, AND STORAGE FOR A LIQUID HYDROCARBON USING SEPARATION MEANS

The invention relates to a means for the avoidance and/or elimination of microbial growth in a storage for a liquid hydrocarbon according to the preamble of claim 1, method for avoiding and/or destroying microbial growth in a storage for a liquid hydrocarbon according to the preamble of claim 8, and storage for a liquid hydrocarbon according to the preamble of claim 10.

Microorganisms and microbes such as bacteria, yeasts, algae and fungi, some of which grow to sizes beyond the micrometric range are commonly present in stores for liquid hydrocarbons, i.e. in stationary and mobile storage containers for liquid hydrocarbons. This is true in particular for combustion agents, fuel and propellants used in refinery, marine, aviation and automotive applications, such as diesel, biodiesel, heating oil, gasoline, kerosene, biokerosene and naphtha.

In this document, the terms "storage for a liquid hydrocarbon" and "hydrocarbon storage" are used interchangeably.

The number of microorganisms increases constantly during storage. The hydrocarbons function as substrates or nutrients for the microorganisms. Particularly biodiesel contains readily biodegradable components. The determining factor for the constant, undesired proliferation of microorganisms is the unavoidable presence of water or a concentration of water in the liquid hydrocarbon, e.g., a combustion agent, fuel or propellant. As a rule, over time the water settles at the bottom of the hydrocarbon storage, i.e. for example in a storage for combustion agent, fuel or propellant, where provides the microorganisms with a subsistence space. Contamination with water—and consequently with microorganisms—may occur anywhere throughout the entire supply chain from the refinery to the intermediate storage facility to the fuel tank or the heating oil tank, for example when the storage or tank is filled or vented, or by any other form of contamination.

The damage caused by the growth of biomass as a result of microorganisms leads to various problems. Among the most common forms of damage are filtration and separation problems, especially clogging of filters and the associated machinery failures, engine corrosion, storage damage, damage to injection pumps and jets up to including complete failure, broken metal parts, pitted turbine blades and general corrosion.

The microbial corrosion of diesel tanks and the associated malfunctions of diesel engines caused by microorganisms is called "diesel bug". In the rest of this document, the term "diesel bug" will be used regardless of what kind of combustion agent, fuel or propellant is concerned. "Diesel bug" occurs most often in tanks on seldom used vehicles. Oil heaters in houses that are rarely heated are also commonly affected.

Some methods to address these problems are known in the prior art, they only serve as a short-term solution, if at all.

For example, if the combustion agent, fuel or propellant is heavily infected with microorganisms broad-spectrum biocides are used to destroy a wide variety of different microorganisms. Otherwise, non-toxic enzyme technology may also be used to eliminated existing microorganisms and also prevent them from proliferating. Dosing systems are often provided for carrying out the above two methods, but these are expensive to buy and maintain. Even short-term success with the two aforementioned methods typically requires the use of substantial quantities of biocides or enzymes, which is not ideal from both a financial and ecological point of view.

Furthermore, the methods described above are usually only effective for the short term, if at all. They do not constitute a permanent solution to the problem of microbial load in combustion agents, fuel or propellants, i.e. "diesel bug". Consequently, the treatment with biocides, enzymes, or other means must be repeated, which is expensive and detrimental to the environment. Regarding the use of biocides, it is also particularly problematic that the microorganisms can develop permanent resistance to the biocides used. Moreover, the dead biomass remains in the tank or storage, with the result that even after a heavy infection has been treated with initial success with biocides, the tank or storage must be cleaned meticulously to prevent the filters from becoming clogged or other damage of some kind.

To avoid recontamination, a fully automated tank drainage system is used for example, with which the tank can be drained regularly. But for this, a special design is necessary for storage tanks as well as fuel bunkers and consumer tanks. Drainage pipes must also be connected at the lowest point. One particularly disadvantageous consideration in this regard is that the combustion agent, fuel or propellant is inevitably contaminated with water from the ambient air when it is drained or pumped out of the tank for intermediate storage. And a not insignificant volume of condensation water typically forms inside the closed tank, which means that the water concentration must be determined regularly and if necessary drained again. In all, this method is technically challenging and thus expensive to plan and carry out. The fully automated nature of the system also makes it expensive to purchase and prone to malfunction, so it requires significant maintenance effort.

The object of the present invention is to overcome the disadvantages of the prior art and to provide a means with which microbial growth in a storage for a liquid hydrocarbon can be prevented and/or destroyed simply, inexpensively, efficiently and sustainably. The means should be usable as a remedy for an existing condition and preventively. The object is to provide a long-term solution which conserves both the environment and resources and maintains the quality of liquid hydrocarbons to be stored on in storage. A method should also be provided for the simple, inexpensive, effective and sustainable prevention and/or destruction of microbial growth in a storage for a liquid hydrocarbon. The method should be usable for existing conditions and preventively, and enable conservation of both the environment and resources while maintaining the quality of liquid hydrocarbons stored or to be stored. A storage for a liquid hydrocarbon should also be provided which enables microbial growth to be prevented and/or destroyed simply, inexpensively, efficiently and sustainably while onserving both the environment and resources.

The main features of the invention are stated in the characterising part of claim 1, claim 8 and claim 10. Variants thereof constitute the subject matter of claims 2 to 7, 9 and 11.

The object is achieved with a means for the avoidance and/or elimination of microbial growth in a storage for a liquid hydrocarbon, wherein the means is a separation means, with which an interface between a phase of a liquid hydrocarbon and a water phase can be reduced, and wherein the means has a density which is greater than the density of a liquid hydrocarbon and lower than the density of water.

The inventive means serves to prevent and/or destroy microbial fouling by microbial growth caused in particular by bacteria, fungi, yeasts and algae in a storage for a liquid hydrocarbon simply, cheaply, efficiently and sustainably. The proliferation of microorganisms can be inhibited efficiently and sustainably and/or microorganisms can be killed efficiently. The means may advantageously be used to treat existing conditions and preventively. The means represents a long-term solution for maintaining the quality of the respective liquid hydrocarbon, e,g., a combustible medium, fuel or propellant while conserving the environment and resources.

The means can also be handled easily and safely, and guarantees a long-term effect. When the means is used, it is no longer necessary to invest significant time and effort in cleaning the hydrocarbon storage after every use of the hydrocarbon storage, because the formation of unwanted biomass is significantly reduced or inhibited in advance. Thus, the consequential costs for cleaning, maintaining and repairing the hydrocarbon storage are also reduced by the use of the means to treat and/or avoid the condition.

For the purposes of the invention, microbial growth is understood to be the formation of biomass caused by the action of microorganisms, particularly in the form of bio-sludge. For the purposes of the invention, the microbial contamination caused by the proliferation of microorganisms such as bacteria, yeasts, algae and fungi—some of which grow to sizes beyond the micrometric range—in a storage for liquid hydrocarbon is referred to as "diesel bug" regardless of the nature of the liquid hydrocarbon.

The prevention and/or destruction of microbial growth may consist of inhibiting the proliferation of microorganisms which are already present in the hydrocarbon storage and/or eliminating them. Overall, therefore, a high quality of the respective hydrocarbon may be guaranteed. The hydrocarbon storage may be for example to store a combustion agent, fuel or propellant, in particular a stationary or a mobile storage for at least one liquid hydrocarbon. The hydrocarbon storage may be for example a refinery storage, a tanker ship, a car, aeroplane, boat or ship's tank. A mixture of various liquid hydrocarbons may also be present. The hydrocarbon is in particular selected from a group consisting of diesel, biodiesel, heating oil, gasoline, kerosene, biokerosene and naphtha.

The means may be arranged in the area of the interface between the hydrocarbon phase and the aqueous phase, so that the interface or contact area between the two phases may be reduced or—depending on the configuration of the means—even eliminated entirely. Consequently, any microorganisms may be deprived of the environment that supports their subsistence, since microorganisms need the hydrocarbon as a source of nutrition and energy and water as habitat. As a logical consequence, any microorganisms already present may be killed or at least their proliferation can be inhibited. Thus, the production and growth of biomass, particularly in the form of byproducts of microorganism metabolism is prevented or at least strongly inhibited.

It is particularly advantageous that the means establishes itself in the area where the problem of microorganism loading in the fuel arises—i.e. in the region of the hydrocarbon/water interface—without further intervention, simply based on its density. For the purposes of the invention, the density of the means is its total density. The density of the means may be adjusted specifically according to the application case, that is to say depending on the hydrocarbon that is stored or to be stored in the hydrocarbon storage. This adaptability of the means makes it very versatile.

The means is not and does not contain any substance or mixtures of substances which can serve as a source of nutrients for the microorganisms that caused "diesel bug".

In one important embodiment, the means advantageously contains a non-stick substance and/or a biocide and/or a biostatic. Examples of non-stick substances include polytetrafluoroethylene (PTFE, Teflon®) and perfluoroalkoxy polymers (PFA, Teflon® PFA). Depending on the required density and cost, the means may consist partially or entirely of the non-stick material or, for example, only the surface thereof may be coated with such a material. It may be for for example a centrosymmetrical solid or hollow body having two identical hemispheres, such as a ball, wherein only the surface of one hemisphere has the non-stick substance. The non-stick substance lends a further "beading" effect to the means which is positioned in the region of the interface between the hydrocarbon and the water phase due to its density. This strengthens the effect of the means—that of reducing the interface or contact surface between the two phases. Because the microorganisms, which favour the water phase are prevented still more effectively from reaching the nutrients in the hydrocarbon phase that are essential for their survival by the "beading" effect of the means surface.

Regardless of whether the means consists of the non-stick material or is only coated therewith, the surface may include a biocide and/or a biostatic. In this context, the non-stick material may be doped with biocide and/or biostatic, for example. The presence of a biocide has the effect of killing microorganisms that exist on the water/hydrocarbon interface, particularly bacteria, fungi, yeasts and algae. In the presence of a biostatic, the proliferation of such microorganisms is inhibited. There are also biocides which function as biostatics at the same time, and vice versa.

In order to improve the long-term effect, a doping substance which also contains various biocides and/or biostatics may be selected for a means that includes a non-stick substance. In this case, it is advantageous if the various biocides and/or biostatics interact to varying degrees with the surface of the means. Then the biocides and/or biostatics may be added separately over a long period. This in turn may improve the long-term effect.

Alternatively, the surface of one embodiment of the means which has no non-stick material may be coated or doped with a biocide and/or a biostatic.

It may be decided whether the means—with or without a non-stick material—is to be doped or coated depending on the effectiveness and price of the respective biocide and/or biostatic. For example, doping and/or coating with a biocide and/or biostatic may be omitted entirely if the microorganism load seems to render such use unnecessary. In such a case, the means represents a particularly resource- and environmentally friendly and cost-effective solution.

In a preferred embodiment of the means, it is provided that the means is a solid substance. Then, the solid preferably has the form of a floating body, e.g., a solid or hollow body comprising one or more materials which is insoluble in both the liquid bydrocarbon and water. In order to reduce the hydrocarbon/water interface as far as possible, the means may for example have a certain longitudinal or areal dimension. Alternatively or additionally, several means can be used. Depending on the number and/or configuration of the floating body, the hydrocarbon/water interface may be eliminated entirely. If the means contains a biocide and/or biostatic and if the effective radius of the biocide and/or biostatic sufficiently definable and sufficiently large, the number of solid bodies needed for a given hydrocarbon storage can be calculated in advance. The solid bodies are then arranged at a suitable distance from one another, wherein it is important to ensure the hydrocarbon/water interface is reduced sufficiently at all points. A defined spacing between the solid bodies may be achieved for example by arranging and fixing the solid bodies releasably at a definable distance from each other in a net-like matrix or mesh product consisting of textile or metal strands. Alternatively, the solid bodies may be arranged and fixed releasably at predefinable intervals along at least one textile or metal strand. This also makes it easy to replace one or more of the solid bodies. Overall, this also serves to lower costs.

Alternatively or additionally, the means may be a liquid which is preferably with little or no miscibility with the liquid hydrocarbon and little or no miscibility with water.

In a further variant of the means, the liquid may contain a biocide and/or biostatic. In this case, the concentration of the biocide and/or the biostatic in the liquid phase should be chosen such that existing microorganisms can still be destroyed and/or their propagation can be inhibited efficiently. In this way, a long-term effect is ensured.

Furthermore, the liquid may itself constitute the biocide and/or the biostatic, in which case such a liquid should be immiscible or poorly miscible with the hydrocarbon and water.

Regardless of the type of liquid chosen, the volume of the liquid is preferably chosen in such a ratio to the determinable volumes of hydrocarbon and water that a miscibility gap is created both between the liquid and the hydrocarbon and between the liquid and the water. This prevents the formation of a homogeneous phase consisting of hydrocarbon and liquid or water and liquid. This also ensures separation of the hydrocarbon and water phases. A long-term effect can be ensured by the choice of the layer thickness of the liquid phase, because a reservoir of the biocide and/or biostatic is provided depending on layer thickness. The thicker the layer of the liquid phase, the greater the distance between the hydrocarbon phase and the aqueous phase, mixing of the two phases can be largely precluded even if vibration occurs.

In a further embodiment of the means, it is provided that the biocide and/or biostatic can be dispensed in controlled manner. The biocide and/or biostatic may be dispersed or dissolved in the liquid or delivered constantly by the means in solid form. The microorganisms prefer to reside in the aqueous phase. The microorganisms are exposed to the biocide and/or biostatic at least at the interface between the water phase and the liquid phase or the surface of the solid. In this way, the microorganisms may be killed and/or the proliferation thereof may be inhibited efficiently and sustainably. The controllable release of the biocide and/or biostatic is particularly advantageous for long-term action, particularly if the biocide and/or biostatic is discharged relatively slowly, and as needed. In this way, the microorganisms may be prevented from developing resistance to the active substance of the biocide and/or biostatic. Additionally, the need to buy quantities of generally expensive biocides and/or biostatics required may be reduced. Thus, a solution is provided which is particularly advantageous from both a financial and an environmental point of view. Controllable delivery may be achieved for example by furnishing the active particles of the biocide and/or biostatic with a casing, which is more readily soluble in water than the active ingredient particles themselves. Alternatively or additionally, a mixture of various biocides and/or biostatics which exhibit different degrees of interaction with the means may be used.

In a further embodiment of the means, it is provided that the biocide is a microbicide and the biostatic is a microbiostatic. Microbicides are substances or mixtures of substances that kill microorganisms. Depending on the application, substances may be used that specifically kill only one type of microorganism, in particular bacteria, fungi, yeasts or algae. These substances are called bactericides, fungicides—for killing both fungi and yeasts—and algicides. Or microbicides may used that kill more than one type of microorganism. The use of such microbicides reduces the effort involved, since only one microbicide has to be added to the respective hydrocarbon storage. Microbiostatics are substances or mixtures of substances which inhibit the proliferation of microorganisms. For the rest, the above notes on microbicides apply similarly for the microbiostatics intended.

In a further variant of the means, it is provided that the biocide and/or the biostatic contain(s) silver and/or a silver salt. Silver and silver salts have both bactericidal and bacteriostatic action, which makes their use particularly efficient. The bactericidal and bacteriostatic effects are satisfactory both with elemental silver and in the case of silver in the ionic form.

In another embodiment of the means, it is provided that the biocide and/or biostatic is present as particles. This ensures that a relatively large surface area of the biocide and/or biostatic is available, which enhances the efficiency of the means. The biocide and/or biostatic may particular be provided as nanoparticles and/or in the form of nanofibres. In this way, the surface is enlarged further, thus increasing the efficiency of the means. The nanofibres may be present for example as monofilaments and/or as a lattice-like structures and/or filaments. The particles and fibres may have diameters between 10 nm and 2000 nm, preferably between 100 nm and 1000 nm, more preferably between 150 nm and 500 nm, and very particularly preferably between 200 nm and 300 nm.

The object is further achieved with a method for preventing and/or destroying microbial growth in a storage for a liquid hydrocarbon which comprises the steps of:
  introducing a means as a separation means, which has a greater density than a liquid hydrocarbon and lower density than water, and
  reducing an interface between a phase of the liquid hydrocarbon and a water phase.

The inventive method is suitable for simple, low cost, efficient and sustained prevention and/or destruction of microbial growth in a storage for a liquid hydrocarbon. The hydrocarbon storage may be for example a storage for combustion agents, fuel or propellants. The method is usable both for treating existing conditions and preventively and also enables an environmentally and resource-conservative solution for maintaining the quality of the combustion agent, fuel or propellant that is stored or to be stored for the long term. The arrangement of a means as a separation means in the region of the hydrocarbon/water interface serves to reduce the interface or contact surface between the two phases. This in turn deprives the microorganisms present in the hydrocarbon storage of their basis for subsistence since microorganisms require the hydrocarbon as source of nutrients and energy and the water as a habitat. The inevitable consequence thereof is that existing microorganisms can be killed, or at least their proliferation can be inhibited.

In an important embodiment of the method, the means contains a non-stick material and/or a biocide and/or a biostatic. It is advantageous if the biocide and/or biostatic is/are releasable in controlled manner.

The object is further solved with a storage for a liquid hydrocarbon in which it is provided that a means is arranged as a separation means between a phase of a liquid hydrocarbon and a water phase, wherein an interface between a phase of the liquid hydrocarbon and the water phase is reduced.

The inventive storage for a liquid hydrocarbon—hereinafter also referred to as a hydrocarbon storage—enables the prevention and/or destruction of microbial growth, which is characterised in that it is simple, inexpensive, efficient, sustainable, and conserves the environment and resources. The hydrocarbon storage may also be a repository for combustion agents, fuel or propellants. Due to the arrangement of a means as a separation means in the area of the hydrocarbon/water interface, the interface or contact surface between the two phases is reduced. Consequently, the microorganisms present in the hydrocarbon storage are deprived of a survival basis, since microorganisms need the hydrocarbon as a source of nutrients and energy and water as a habitat. The logical consequence of this is that the existing microorganisms can be killed, or at least their proliferation can be inhibited.

In an important embodiment of the hydrocarbon storage, it is provided that the means contains a non-adhesive material and/or a biocide and/or a biostatic. In this context, it is advantageous if the biocide and/or biostatic is/are releasable in controlled manner.

Special design variants and the related advantages of the means, the method and the storage for a liquid hydrocarbon, each of which has been described in connection with one or other of the objects of the invention also apply for the section of text relating thereto.

Further features, details and advantages of the invention will become apparent from the wording of the claims and from the following description of embodiments with reference to the drawings. In the drawings:

Figure 1:
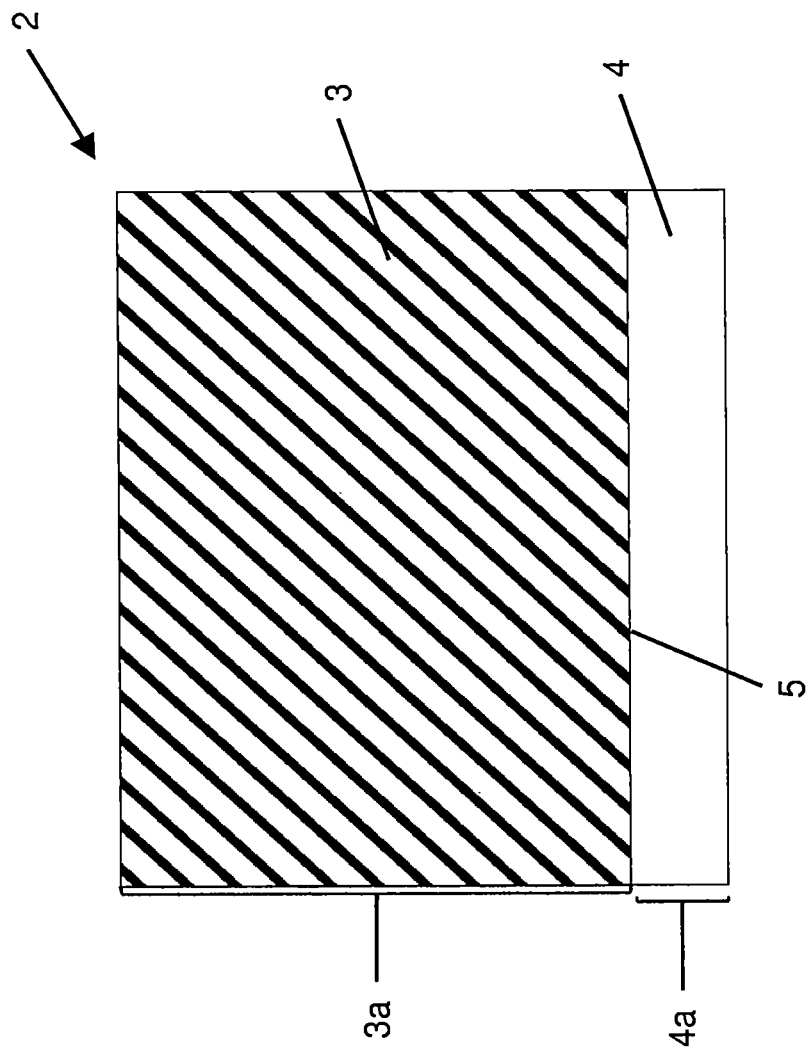
FIG. 1 shows a conventional storage for a liquid hydrocarbon.

FIG. 1 shows a conventional hydrocarbon storage 2. The top region of conventional hydrocarbon storage 2 contains a phase 3a of a liquid hydrocarbon 3, which is in contact with a water phase 4a via an interface 5. The one or more hydrocarbons 3 serve as substrates or nutrients for microorganisms or microbes, particularly for bacteria, yeasts, fungi and algae. The water 4 which is unavoidably present in the combustion agents, fuel or propellants represents habitat for microorganisms. It is particularly problematic that contamination with water 4 may occur anywhere throughout the entire supply chain from the refinery to the intermediate storage facility to the fuel tank or the heating oil tank, for example when the storage or tank is filled or vented. The biomass growth caused by the microorganisms leads to many different kinds of damage, for example filtering and separation problems, particularly the clogging of filters and associated machine malfunctions, engine corrosion, storage damage, damage to injection pumps and nozzles, up to and including their failure, broken metal parts, eroded turbine blades and general corrosion. The microbial corrosion of diesel tanks and the associated diesel engine malfunctions caused by microorganisms is called "diesel bug".

Figure 2:
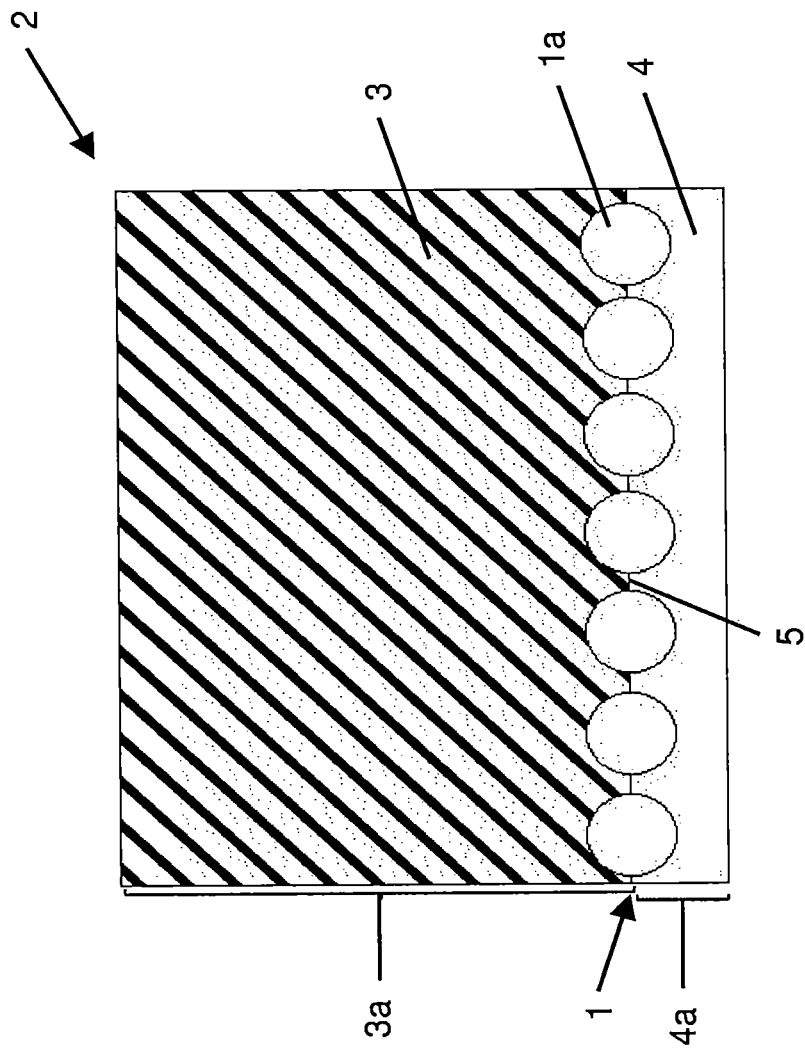
FIG. 2 shows a storage for a liquid hydrocarbon inside which is arranged a means in the form of multiple solid bodies located at a distance from each other.

FIG. 2 shows a hydrocarbon storage 2 according to an embodiment of the present invention. It may be a fixed location or mobile storage 2 for a wide variety of liquid hydrocarbons 3, which are used in the refinery, marine, aviation and automotive industries for example. Combustion agents, fuel or propellants such as diesel, biodiesel, heating oil, gasoline, kerosene, biokerosene or naphtha may be stored and/or transported therein. Unlike the hydrocarbon storage shown in FIG. 1, storage 2 is characterised in that a means 1 in the form of several solid bodies 1a spaced apart from each other is arranged on the interface or contact surface 5 between phase 3a of liquid hydrocarbon 3 and the water phase 4a. Advantageously, this has the effect of reducing interface 5. Means 1 thus functions as a separation means.

With the hydrocarbon storage 2 shown in FIG. 2, prevention and/or destruction of microbial growth, particularly in the presence of bacteria, yeasts, fungi and algae, is ensured. At the same time, such prevention and/or destruction may entail inhibiting the proliferation of existing microorganisms and/or killing them. The arrangement of the solid bodies 1a in the area of the interface between hydrocarbon phase 3a and water phase 4a has the effect of reducing or—depending on the configuration of solid bodies 1a—even entirely eliminating interface 5 or the contact surface between the two phases 3a, 4a. Consequently, the microorganisms existing in hydrocarbon storage 2 are deprived of the environment that supports their subsistence, since microorganisms need the hydrocarbon 3 as a source of nutrition and energy and water 4 as habitat. As a logical consequence, the microorganisms already present may be killed or at least their proliferation may be strongly inhibited.

It is particularly advantageous that means 1 or solid 1 establishes itself in the area where the problem of microorganism loading in the hydrocarbon 3 arises—i.e. in the area of interface 5—solely by virtue of its density, which is adjustable in advance according to the application case. The density of the means may be adjusted specifically according to the application case, that is to say depending on the hydrocarbon 3 or hydrocarbon mixture that is stored or to be stored in the hydrocarbon storage. This adaptability of the means 1 or solid 1a makes it very versatile.

Solid 1a is preferably configured as a float, e.g., as a solid or hollow body comprising one or more materials which is not soluble either in the liquid hydrocarbon 3 or in the water 4. In order to reduce interface 5 as far as possible, a plurality of spherical solid bodies 1a arranged are used as shown in FIG. 2. A defined spacing of solid bodies 1a with respect to each other may be achieved for example if solid bodies 1a are disposed in a net-like matrix or mesh product consisting of textile or metal strands or are arranged and fixed releasably along at least one textile or metal strand wherein the distance between solid bodies 1a is predefinable. This also makes it easy to replace one or more solid bodies 1a.

Alternatively or additionally, one or more solid bodies 1a may be used that have a certain longitudinal or areal dimension. Depending on the number and/or configuration of floating bodies 1a, it may be possible to eliminate interface 5 entirely.

Solid 1a may comprise a biocide and/or a biostatic, either in the form of a doping substance or a coating. If the radius of action of the biocide and/or biostatic is sufficiently definable and sufficiently large, the number of solid bodies 1a required can be calculated. When using multiple solid bodies 1a, particular attention must always be paid to ensure sufficient reduction of interface 5.

Alternatively or additionally to a biocide and/or biostatic, solid 1a may contain a non-stick material such as polytetrafluoroethylene (PTFE, Teflon®) or a perfluoroalkoxy polymer (PFA, Teflon® PFA). Depending on the required density and cost, solid 1a may consist partially or entirely of the non-stick material, or only the surface thereof may be coated therewith. It may be for for example a centrosymmetrical solid or hollow body having two identical hemispheres, such as a ball, wherein only the surface of one hemisphere has the non-stick substance. The non-stick substance lends a further "beading" effect to the solid 1a which is positioned in the region of the interface 5 due to its density. This further strengthens the effect of the solid 1a—that of reducing the interface or contact surface 5 between the two phases. Because the microorganisms, which favour the water phase 4a as habitat are prevented still more effectively from reaching the nutrients in the hydrocarbon phase 3a that are essential for their survival by the "beading" effect of the surface of solid 1a.

Regardless of whether solid 1a consists of the non-stick material or is only coated therewith, the surface thereof may include a biocide and/or a biostatic. In this case, the non-stick material may be doped with biocide and/or biostatic, for example. The presence of a biocide may have the effect of killing microorganisms that exist on the water/hydrocarbon interface 5. In the presence of a biostatic, the proliferation of such microorganisms is inhibited. There are also biocides which function as biostatics at the same time, and vice versa. In order to improve the long-term effect, a dopant can be selected which comprises various biocides and/or biostatics. In this case it is advantageous if the various biocides and/or biostatics are in varying degrees of interaction with the surface of solid 1a. Then, the biocides and/or biostatics are may be released successively over a long period. Thus, the long-term effect may be improved. Alternatively, the surface of one embodiment of solid 1a which has no non-stick material may be coated or doped with a biocide and/or biostatic.

Figure 3:
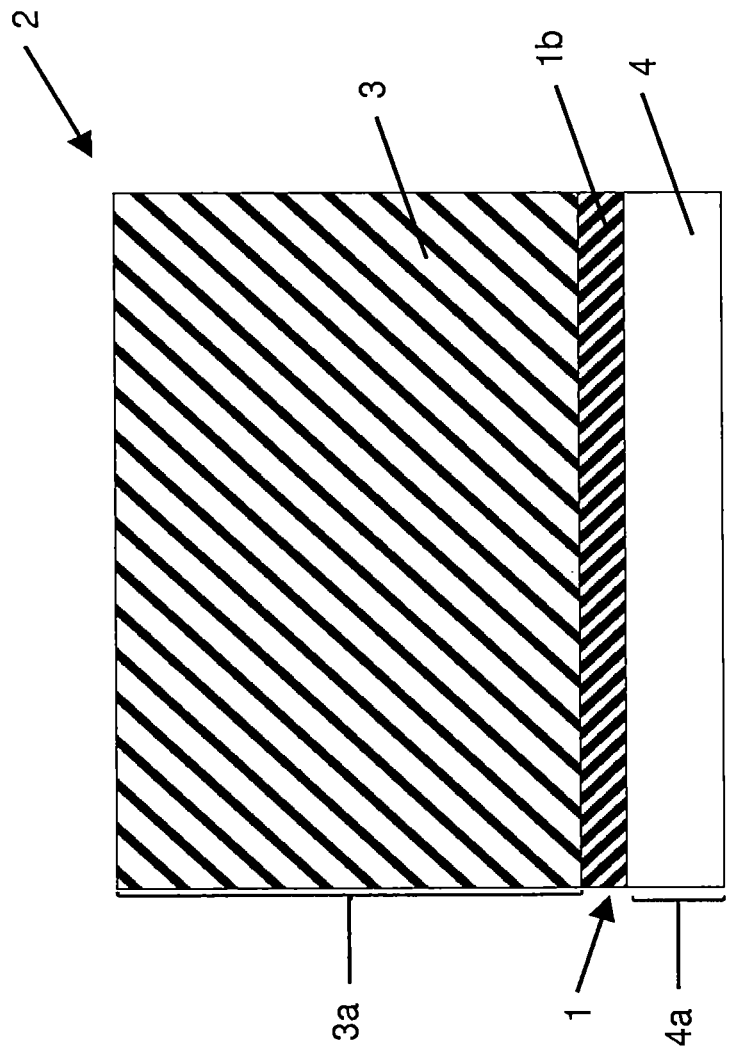
FIG. 3 shows a storage for a liquid hydrocarbon inside which is arranged a means in the form of a liquid.

As shown in FIG. 3, a liquid may also be used as means 1 instead of a solid 1a. Liquid 1b is preferably immiscible or only very poorly miscible with liquid hydrocarbon 3 and preferably immiscible or only very poorly miscible with water 4. Liquid 1b thus acts as a separation means between the water 4 and the liquid hydrocarbon 3.

In one embodiment, liquid 1b contains a biocide and/or a biostatic. The concentration of the biocide and/or biostatic in liquid 1b should be chosen such that it can ensure efficient destruction of existing microorganisms and/or at least inhibit the propagation of microorganisms. In this way, a long-term effect is ensured.

Alternatively, the fluid 1b may itself be the biocide and/or biostatic, in which case liquid 1b should be immiscible or only poorly miscible with the hydrocarbon 3 and with the water 4.

Regardless of the type of liquid 1b chosen, the volume of the liquid 1b is preferably chosen in such a ratio to the determinable volumes of hydrocarbon 3 and water 4 that a miscibility gap is created both between the liquid 1b and the hydrocarbon 3 and between the liquid 1b and the water 4. This prevents the formation of a homogeneous phase consisting of hydrocarbon 4 and liquid 1b or of water 4 and liquid 1b and thus ensures separation of the hydrocarbon phase 3a and the water phase 4a. A long-term effect can be ensured by the choice of the layer thickness of the liquid 1b, because a reservoir of the biocide and/or biostatic is provided depending on layer thickness. The thicker the layer of liquid 1b, the greater the distance between the hydrocarbon phase 3a and the water phase 4a. Then, mixing of the two phases 3a, 4a can be largely prevented even if vibration occurs.

It is also possible to use both a solid 1a and a liquid 1b as the means. And a plurality of different solid bodies 1a and/or several different liquids 1b may be provided in the same embodiment.

If a solid 1a and/or a liquid 1b is provided which contains/contain a biocide and/or biostatic, it is advantageous if the biocide and/or biostatic is dispensable in controlled manner. The biocide and/or biostatic may be dispersed or dissolved in liquid 1b. The microorganisms are exposed to the biocide and/or biostatic at least at the interface between the water phase 4a and the liquid phase 1b or the surface of the solid 1a. In this way, the microorganisms may be killed and/or the proliferation thereof may be inhibited. The controllable release of the biocide and/or biostatic is particularly advantageous for long-term action, particularly if the biocide and/or biostatic is discharged relatively slowly and as needed. In this way, the microorganisms may be prevented from developing resistances to the active substance of the biocide and/or biostatic. Additionally, the need for large quantities of the generally expensive biocides and/or biostatics required may be reduced. Thus, this embodiment of the hydrocarbon storage 2 provides a solution that is particularly advantageous from both a financial and an environmental point of view. Controllable delivery may be achieved for example by furnishing the active particles of the biocide and/or biostatic with a casing which is more readily soluble in water than the active ingredient particles themselves. Alternatively or additionally, a mixture of various biocides and/or biostatics which exhibit different degrees of interaction with the means 1 may be used.

In a further variant of the hydrocarbon storage 2 shown in FIG. 2, the biocide and/or biostatic contain(s) silver and/or a silver salt. The use of silver and/or silver salts is particularly efficient because they have both bactericidal and bacteriostatic properties. The bactericidal and bacteriostatic effects are satisfactory both with elemental silver and with silver in ionic form.

The biocide and/or biostatic may be present as particles. This ensures that a relatively large surface area of the biocide and/or biostatic is available, which enhances the efficiency of means 1. Preferably, nanoparticles and/or nanofibres are used. In this way, the surface is enlarged further, thus increasing the efficiency of the means 1. The nanofibres may be present for example as monofilaments and/or as a lattice-like structures and/or filaments. The particles and fibres may have diameters between 10 nm and 2000 nm, preferably between 100 nm and 1000 nm, more preferably between 150 nm and 500 nm, and very particularly preferably between 200 nm and 300 nm.

Overall, hydrocarbon storage 2 serves to prevent microbial fouling particularly in the presence of bacteria, yeasts, fungi and algae cheaply, efficiently and sustainably. A long-term solution is provided that preserves both the environment and resources while maintaining the quality of the respective liquid hydrocarbon, particularly a combustible medium, fuel or propellant. The hydrocarbon storage 2 can also be handled easily and safely. It is no longer necessary to invest significant time and effort in cleaning the hydrocarbon storage 2 after every use, because the formation of unwanted biomass is significantly reduced or inhibited in advance by the presence of means 1. Thus, the consequential costs for cleaning, maintaining and repairing the hydrocarbon storage 2 are also reduced by the use of the means 1 to treat an existing condition and/or as a preventative measure.

The invention is not limited to any one of the embodiments described above, it can be modified in many ways.

All of the features and advantages described in the claims, the description and the drawings including design details, spatial configurations and procedural steps, may be essential to the invention both individually and in a wide range of combinations.

LIST OF REFERENCE SIGNS

1 Means
1*a* Solid
1*b* Liquid
2 Storage for a liquid hydrocarbon/hydrocarbon store
3 Liquid hydrocarbon
3*a* Phase of a liquid hydrocarbon
4 Water
4*a* Phase of water
5 Interface

The invention claimed is:

1. Means for the avoidance and/or elimination of microbial growth in a storage for a liquid hydrocarbon, the means comprising:
   a separation means with which an interface between a phase of a liquid hydrocarbon and a phase of water can be reduced, and
   wherein the separation means has a density which is greater than a density of the liquid hydrocarbon and which is lower than a density of the water,
   the separation means contains a non-stick substance including polytetrafluoroethylene (PTFE) or perfluoroalkoxy polymers (PFA),
   the separation means consisting of the non-stick substance or being coated with the non-stick substance,
   the surface of the non-stick substance including a biocide and/or a biostatic,
   the biocide and/or a biostatic being active particles formed as nanoparticles and/or nanofibers, wherein the biocide and/or biostatic can be released in a controlled manner, the controlled manner achieved by furnishing the active particles of the biocide and/or biostatic with a casing, which is more soluble in the water than the active particles of the biocide and/or biostatic.

2. Means according to claim 1, characterized in that the separation means is a solid.

3. Means according to claim 1, characterized in that the biocide is a microbiocide.

4. Means according to claim 1, characterized in that the biocide contains silver.

5. A method for the avoidance and/or elimination of microbial growth in a storage for a liquid hydrocarbon, comprising the following steps:
   introduction of a means as a separation means, which has a greater density than a liquid hydrocarbon and which has a lower density than water, and
   reduction of an interface between a phase of the liquid hydrocarbon and a water phase.

6. Method according to claim 5, characterized in that the means comprises a non-stick material and/or a biocide and/or a biostatic.

7. A storage for a liquid hydrocarbon, characterized in that a means is arranged as a separation means between a phase of a liquid hydrocarbon and a water phase, whereby an interface between a phase of the liquid hydrocarbon and a water phase is reduced.

8. Storage for a liquid hydrocarbon according to claim 7, characterized in that the means comprises a non-stick material and/or a biocide and/or a biostatic.

9. Means for the avoidance and/or elimination of microbial growth in a storage for a liquid hydrocarbon, the means comprising:
   a separation means with which an interface between a phase of a liquid hydrocarbon and a phase of water can be reduced, and
   wherein the separation means has a density which is greater than a density of the liquid hydrocarbon and which is lower than a density of the water,
   wherein the separation means is a solid, which is designed as a floating body, formed as a full or hollow body comprising one or more materials that are neither soluble in liquid hydrocarbon nor soluble in water,
   the separation means contains a non-stick substance including polytetrafluoroethylene (PTFE) or perfluoroalkoxy polymers (PFA),
   a surface of the non-stick substance being doped with a biocide and/or a biostatic.

10. Means according to claim 9, characterized in that the biocide is a microbiocide.

11. Means according to claim 9, characterized in that the biocide contains silver.

* * * * *